(12) United States Patent
Yamazaki et al.

(10) Patent No.: US 11,828,221 B2
(45) Date of Patent: Nov. 28, 2023

(54) SCHNUERLE SCAVENGING TWO-STROKE ENGINE

(71) Applicant: YAMABIKO CORPORATION, Tokyo (JP)

(72) Inventors: Takahiro Yamazaki, Tokyo (JP); Ken Shirai, Tokyo (JP); Hisato Onodera, Tokyo (JP); Koichirou Ogura, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/080,769

(22) Filed: Dec. 14, 2022

(65) Prior Publication Data

US 2023/0193811 A1   Jun. 22, 2023

(30) Foreign Application Priority Data

Dec. 16, 2021   (JP) .................... 2021-204653

(51) Int. Cl.
*F02B 25/14*   (2006.01)
*F02B 17/00*   (2006.01)
(Continued)

(52) U.S. Cl.
CPC .............. *F02B 25/14* (2013.01); *F02B 17/00* (2013.01); *F02B 75/02* (2013.01); *F02F 1/22* (2013.01); *F02B 2075/025* (2013.01)

(58) Field of Classification Search
CPC .... F02B 75/02; F02B 2075/025; F02B 17/00; F02B 25/14; F02F 1/22
See application file for complete search history.

(56) References Cited

U.S. PATENT DOCUMENTS 4,469,054 A * 9/1984 Onishi .................... F02B 25/20
                                                123/430
5,251,580 A * 10/1993 Torigai .................... F02B 25/20
                                                123/65 PD
(Continued)

FOREIGN PATENT DOCUMENTS

| EP | 2770180 A2 | 8/2014 |
| JP | 2000034927 A | 2/2000 |
| JP | 2000337154 A | 12/2000 |

OTHER PUBLICATIONS

Extended European search report issued in corresponding European Patent Application No. 22214257.2 dated Mar. 15, 2023 (7 pages).

*Primary Examiner* — Kevin A Lathers
(74) *Attorney, Agent, or Firm* — Kilyk & Bowersox, P.L.L.C.

(57) ABSTRACT

A Schnuerle scavenging two-stroke engine is provided that can keep combustion stability in a wide rotation speed range while suppressing blow-by. The engine of the present invention is a Schnuerle scavenging two-stroke engine (2). A scavenging passage (14(in1)) related to at least one scavenging port (16(in1)) has, at its upper end portion (14*a*(in1)), an intake-side wall surface (204). The intake-side wall surface (204) defines a first flow direction (42) of scavenging gas discharged from the scavenging port (16(in1)) at a height level of the scavenging port (16(in1)). The upper end portion (14*a*(in1)) of the scavenging passage (14(in1)) related to the scavenging port (16(in1)) has a guide portion (50) defining a second flow direction (44) of scavenging gas discharged from the scavenging port (16(in1)). The second flow direction (44) is deflected to the intake side from the first flow direction (42) at the height level of the scavenging port (16(in1)).

13 Claims, 9 Drawing Sheets

(51) Int. Cl.
    *F02B 75/02*     (2006.01)
    *F02F 1/22*     (2006.01)

(56) References Cited

U.S. PATENT DOCUMENTS

| | | | |
|---|---|---|---|
| 8,967,100 B2 * | 3/2015 | Otsuji | F02B 33/04 123/73 PP |
| 2004/0250420 A1 | 12/2004 | Uhl et al. | |
| 2011/0308507 A1 | 12/2011 | Yuasa et al. | |
| 2014/0238371 A1 * | 8/2014 | Yamazaki | F02B 33/04 123/73 R |
| 2016/0376979 A1 | 12/2016 | Osawa et al. | |

* cited by examiner

SCHNUERLE SCAVENGING TWO-STROKE ENGINE

FIELD OF THE INVENTION

The present invention relates to a Schnuerle scavenging two-stroke engine.

BACKGROUND OF THE INVENTION

In a scavenging process, a two-stroke engine uses, as scavenging gas, typically air-fuel mixture pre-compressed in a crankcase, to perform scavenging within a cylinder. The two-stroke engine includes a scavenging passage communicating with the crankcase and a combustion chamber. An upper end opening i.e. a scavenging port of the scavenging passage is opened and closed by a piston reciprocating between a top dead center and a bottom dead center. An exhaust port is also opened and closed by the movement of the piston to exhaust burned gas within the combustion chamber to the exterior.

When the piston descends in a combustion process, the exhaust port and the scavenging port are opened in the vicinity of the piston bottom dead center, and at the same instant that the scavenging port opens, scavenging within the cylinder begins. The lower end of the scavenging passage communicates with the crankcase. Therefore, at the same instant that the scavenging port opens, air-fuel mixture pre-compressed by the descending piston is discharged as scavenging gas from the scavenging port into the cylinder.

The well-known two-stroke engine pre-compressing air-fuel mixture in the crankcase involves a "blow-by" problem occurring in the scavenging process. "Blow-by" is a phenomenon in which air-fuel mixture discharged from the scavenging port into the combustion chamber is directly exhausted from the exhaust port without contributing to scavenging. This "blow-by" not only pollutes the environment due to exhaust of unburned air-fuel mixture but also reduces the air supply efficiency $\eta_{tr}$. This results in worsened fuel consumption rate.

In order to address the "blow-by" problem of air-fuel mixture, the Schnuerle scavenging two-stroke engine was proposed and has become the mainstream of current two-stroke engines. The Schnuerle scavenging two-stroke engine is run by orienting scavenging gas (typically air-fuel mixture) discharged from the scavenging port, toward the intake-side cylinder wall surface opposite to the exhaust port. The Schnuerle scavenging two-stroke engine is disclosed in e.g. Patent Document 1. As can be seen from Patent Document 1, in the Schnuerle scavenging two-stroke engine, scavenging gas discharged from the scavenging port is directed toward the cylinder wall surface on the intake side. Afterward, scavenging gas impinges on the cylinder wall surface to reverse and head for the exhaust port.

Patent Document 1 discloses a two-stroke engine having two exhaust-side scavenging ports relatively lying on the exhaust side to confront each other and two intake-side scavenging ports lying on the intake side to confront each other. The two-stroke engine having a total of four scavenging ports is called "four-flow scavenging engine". Patent Document 1 proposes a preferred angle of a first horizontal scavenging angle formed by two scavenging gas flows discharged from the two exhaust-side scavenging ports and a preferred angle of a second horizontal scavenging angle formed by two scavenging gas flows discharged from the two intake-side scavenging ports.

Figure 7:
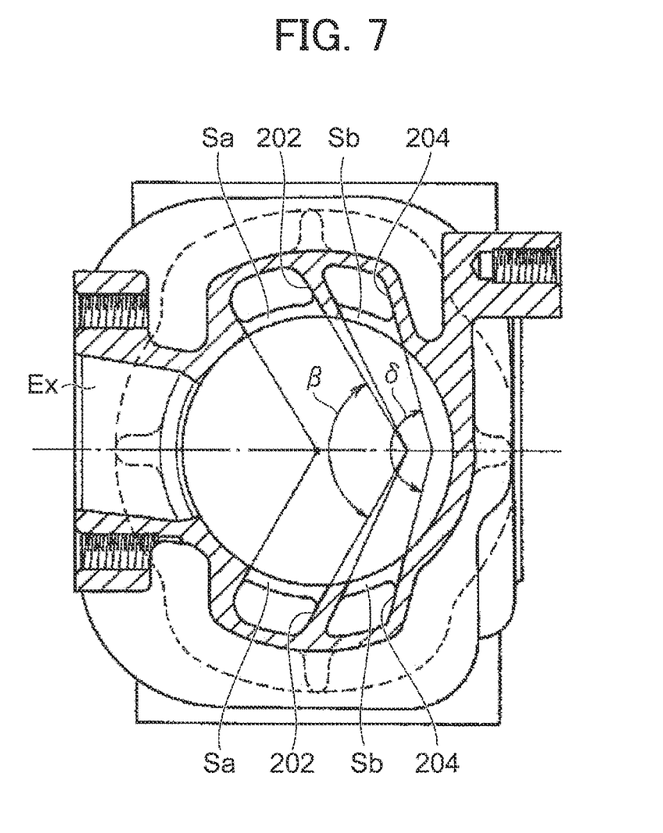
FIG. 7 shows a view for explaining the direction of flow of scavenging gas discharged from scavenging ports of a conventional Schnuerle four-flow scavenging engine.

To extract FIG. 4 of Patent Document 1 to illustrate it as FIG. 7 of this specification, in the diagram, reference letters Ex, Sa, and Sb denote, respectively, an exhaust port, an exhaust-side scavenging port, and an intake-side scavenging port. A first horizontal scavenging angle $\beta$ is defined, at the height level of the exhaust-side scavenging port Sa, by an intake-side wall surface 202 of the upper end portion of the scavenging passage leading to the exhaust-side scavenging port Sa. A second horizontal scavenging angle $\delta$ is defined, at the height level of the intake-side scavenging port Sb, by an intake-side wall surface 204 of the upper end portion of the scavenging passage leading to the intake-side scavenging port Sb.

Patent Document 1: JP-A-2000-34927

As described above, "blow-by" occurs when scavenging gas discharged from the scavenging port into the combustion chamber is directly delivered to the exhaust port without staying in the cylinder. For preventing this, Patent Document 1 described above discloses more inclining i.e. deflecting the flow direction of scavenging gas discharged from the scavenging port, to the intake side, at the height level of the scavenging port, to thereby prevent shortcut to the exhaust port, i.e. blow-by. This is related to the size of the second horizontal scavenging angle $\delta$ at the height level of the intake-side scavenging port Sb described above.

Figure 8:
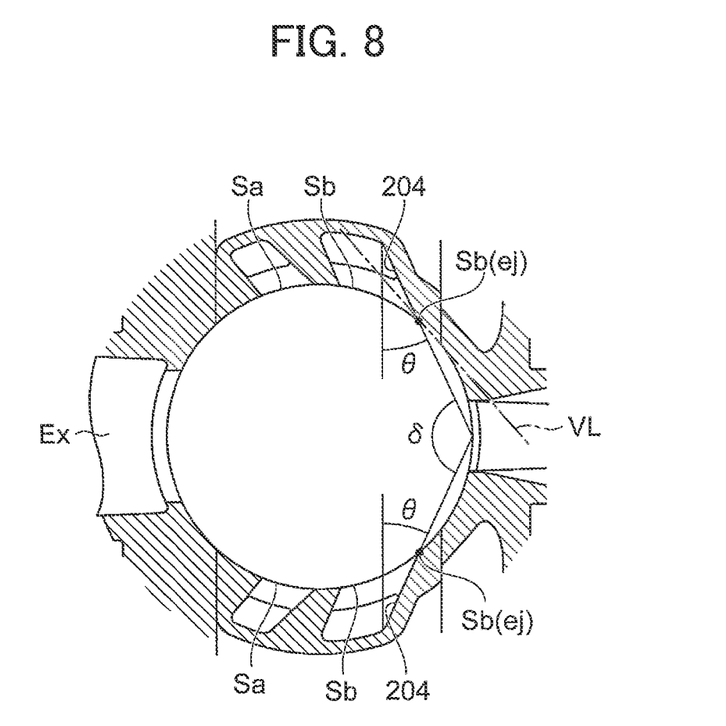
FIG. 8 shows a view for explaining the direction of flow of scavenging gas, discussed by the inventors.

The second horizontal scavenging angle $\delta$ is defined by the intake-side wall surface 204 of the upper end portion of the scavenging passage. Referring to FIG. 8, in order to reduce "blow-by", the tilt angle $\theta$ of the intake-side wall surface 204 is inclined to the intake side at the height level of the intake-side scavenging port Sb, to form the second horizontal scavenging angle $\delta$. As regards the tilt angle $\theta$ of the intake-side wall surface 204, when this tilt angle $\theta$ is increased, the position of an intake-side end edge Sb(ej) of the intake-side scavenging port Sb is displaced to the intake side, and hence there is a spatial limitation on increasing the tilt angle $\theta$. As indicated by a virtual line VL in FIG. 8, in the case of setting a large tilt angle $\theta$ without displacing the position of the intake-side end edge Sb(ej) to the intake side, the passage cross-sectional area of the upper end portion of the scavenging passage leading to the intake-side scavenging port Sb becomes small according as the tilt angle $\theta$ increases. As a result, sufficient gas (air-fuel mixture) for combustion cannot be introduced, which may impair the output.

When the intake-side wall surface 204 is set to have a large tilt angle $\theta$, the rotation speed range ensuring a stable combustion state tends to be narrower. This means that the engine is not suitable for an engine for work machine that uses a wide rotation speed range due to operations from low speed to high speed and vice versa and repeated acceleration/deceleration operations.

SUMMARY OF THE INVENTION

An object of the present invention is to provide a Schnuerle scavenging two-stroke engine capable of keeping combustion stability in a wide rotation speed range while suppressing blow-by even under the above-described spatial restraint on the intake-side scavenging port.

In the present invention, the above technical task is achieved by providing a Schnuerle scavenging two-stroke engine (2) including a plurality of scavenging passages (14) each having a scavenging port (16) that is opened and closed by a piston (6), with scavenging gas discharged from the plurality of scavenging ports (16) being directed toward an intake-side cylinder wall surface opposite to an exhaust port (22) in a scavenging process, the scavenging gas impinging on the cylinder wall surface and reversing to head for the exhaust port (22), in which the scavenging passage (14(in1)) related to at least one (16(in1)) of the plurality of scavenging ports (16) has, at its upper end portion (14a(in1)), an intake-side wall surface (204) that, at a height level of the scavenging port (16(in1)), defines a first flow direction (42) of scavenging gas discharged from the at least one scavenging port (16(in1)) into a combustion chamber (8), the engine (2) comprising:

a guide portion (50) disposed at the upper end portion (14a(in1)) of the scavenging passage (14(in1)) related to the at least one scavenging port (16(in1)), for defining a second flow direction (44) of scavenging gas discharged from the at least one scavenging port (16(in1)) into the combustion chamber (8), the second flow direction (44) being deflected to the intake side from the first flow direction (42) at the height level of the scavenging port (16(in1)).

In a preferred embodiment of the present invention, the scavenging passage (14) having the guide portion (50) is substantially formed by a scavenging passage formation member (72) fixed to a cylinder block (70). The typical Schnuerle scavenging two-stroke engine of the present invention is a four-flow scavenging engine having four scavenging ports (16), the at least one scavenging port is either one or both (16(in1)) of two intake-side scavenging ports lying on the intake side and confronting each other. The present invention is suitably applicable to a stratified scavenging engine.

Operation effects and other objects of the present invention will become apparent from the following detailed description of the preferred embodiment.

DETAILED DESCRIPTION OF THE PRESENT INVENTION

Embodiment

A preferred embodiment of the present invention will now be described with reference to the accompanying drawings.

Figure 1:
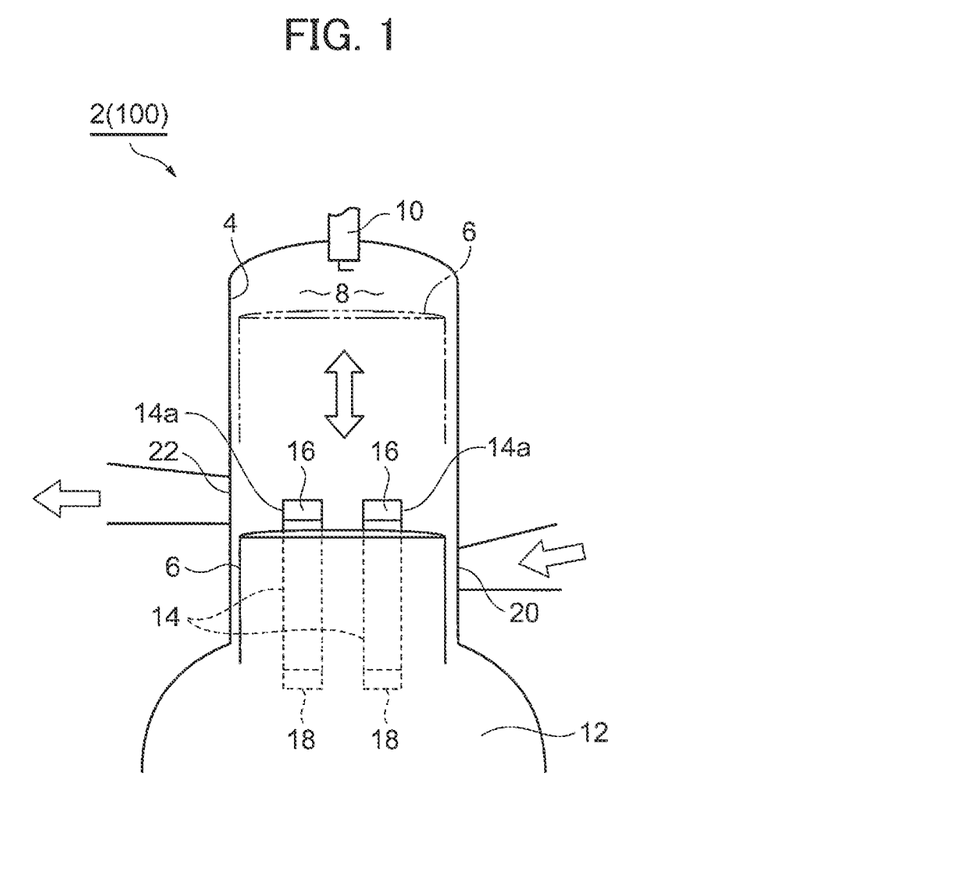
FIG. 1 shows a schematic longitudinal section of a single-cylinder two-stroke engine of the embodiment.

FIG. 1 is a schematic longitudinal section view of an engine 2 of the embodiment included in a single-cylinder two-stroke engine system 100. The engine 2 is suitably applied to portable work machines such as chain saws, blowers, brush cutters, etc. Referring to FIG. 1, the engine 2 shown includes a piston 6 inserted into a cylinder 4, the piston 6 reciprocating between a top dead center and a bottom dead center. A spark plug 10 is arranged in a combustion chamber 8 defined by the piston 6.

The combustion chamber 8 and a crankcase 12 communicate with each other via a scavenging passage 14 in a scavenging process. An upper end portion 14a of the scavenging passage 14 opens to the cylinder 4 through scavenging ports 16. The scavenging ports 16 are rectangular in front view. The scavenging ports 16 are opened and closed by the piston 6. The engine 2 is a "four-flow scavenging engine" having four scavenging ports 16. Although the present invention is not limited to the four-flow scavenging engine, the embodiment will hereinafter be described, as a typical example of the embodiment of the present invention, based on the four-flow scavenging engine shown.

In the four-flow scavenging engine 2 of the embodiment, the four scavenging ports 16 are arranged such that upper edges of the rectangular scavenging ports 16 lie at the same height level in order to synchronize their opening timings. A lower end of each scavenging passage 14 is opened to the crankcase 12, with the opened lower end constituting a scavenging gas inlet 18.

Reference numeral 20 denotes an intake port, through which air-fuel mixture is fed into the crankcase 12. Reference numeral 22 denotes an exhaust port. The exhaust port 22 is arranged opposite to the intake port 20. The engine 2 is a piston valve engine. That is, the intake port 20 and the exhaust port 22 are opened and closed by the piston 6. Air-fuel mixture is fed through the intake port 20 to the crankcase 12, while burned gas within the combustion chamber 8 is exhausted through the exhaust port 22.

Figure 2:
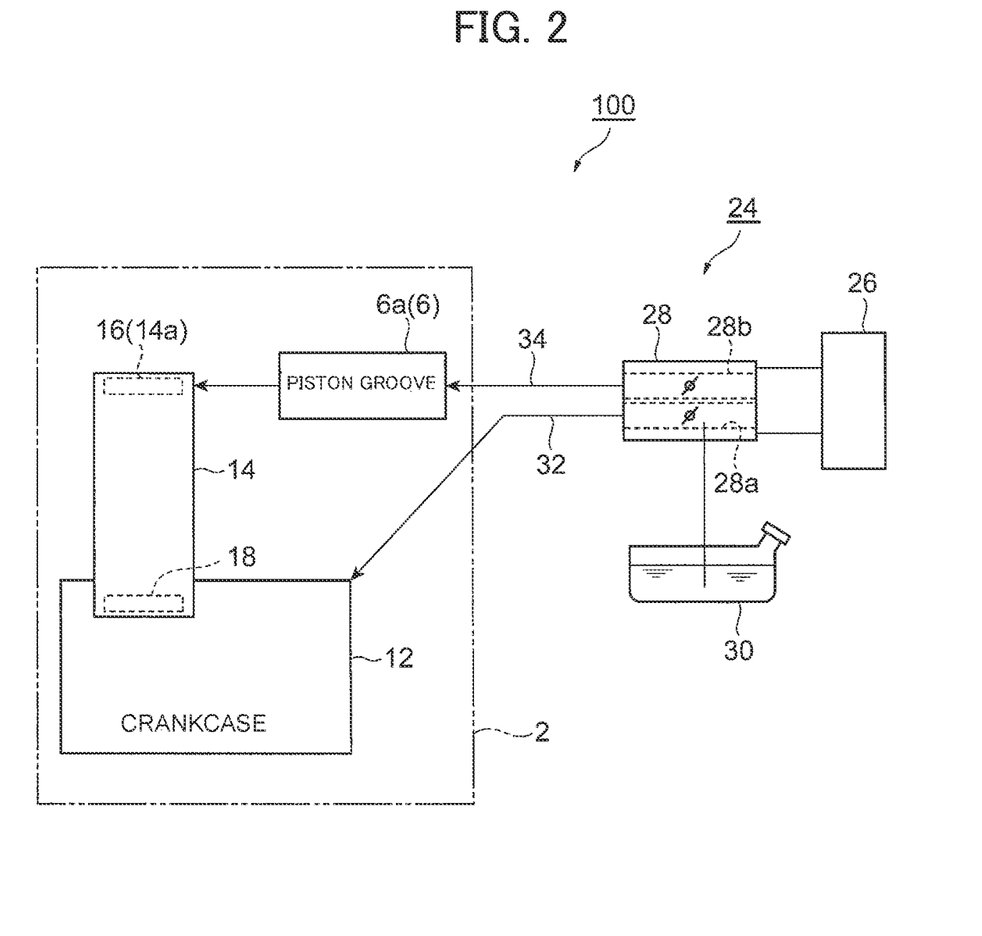
FIG. 2 shows a schematic view of an intake system of the two-stroke engine including the engine of the embodiment.

FIG. 2 is a schematic view of an intake system 24 included in the two-stroke engine system 100. The intake system 24 has an air cleaner 26 at its upstream end so that air purified by the air cleaner 26 is fed to a carburetor 28. Fuel is fed from a fuel tank 30 to an air-fuel mixture generation passage 28a of the carburetor 28 so that air-fuel mixture is generated by the carburetor 28.

The engine 2 is a stratified scavenging engine. The carburetor 28 has the first passage 28a generating air-fuel mixture, and a second passage 28b through which air received from the air cleaner 26 passes. The first passage 28a as the air-fuel mixture generation passage constitutes part of an air-fuel mixture passage 32 communicating with the crankcase 12, with air-fuel mixture generated in the carburetor 28 being fed through the air-fuel mixture passage 32 to the crankcase 12 so that the air-fuel mixture is pre-compressed in the crankcase 12 by the descending piston 6.

The second passage 28b allowing air to pass through constitutes part of a leading air passage 34 feeding leading air to the scavenging passage 14. The piston 6 has a piston groove 6a on its circumferential surface. Leading air received from the air cleaner 26 is fed via the piston groove 6a to the upper end portion of the scavenging passage 14. Since the piston groove 6a is detailed in US2016-0376979A1, description on the piston groove 6a will be omitted. In place of the piston groove 6a, a reed valve may be employed. The reed valve is described in detail in JP2000-337154A.

In the stratified scavenging engine 2, leading air is fed into the combustion chamber 8 at the beginning of the scavenging process, and then air-fuel mixture in the crankcase 12 is fed as scavenging gas into the combustion chamber 8.

Figure 3:
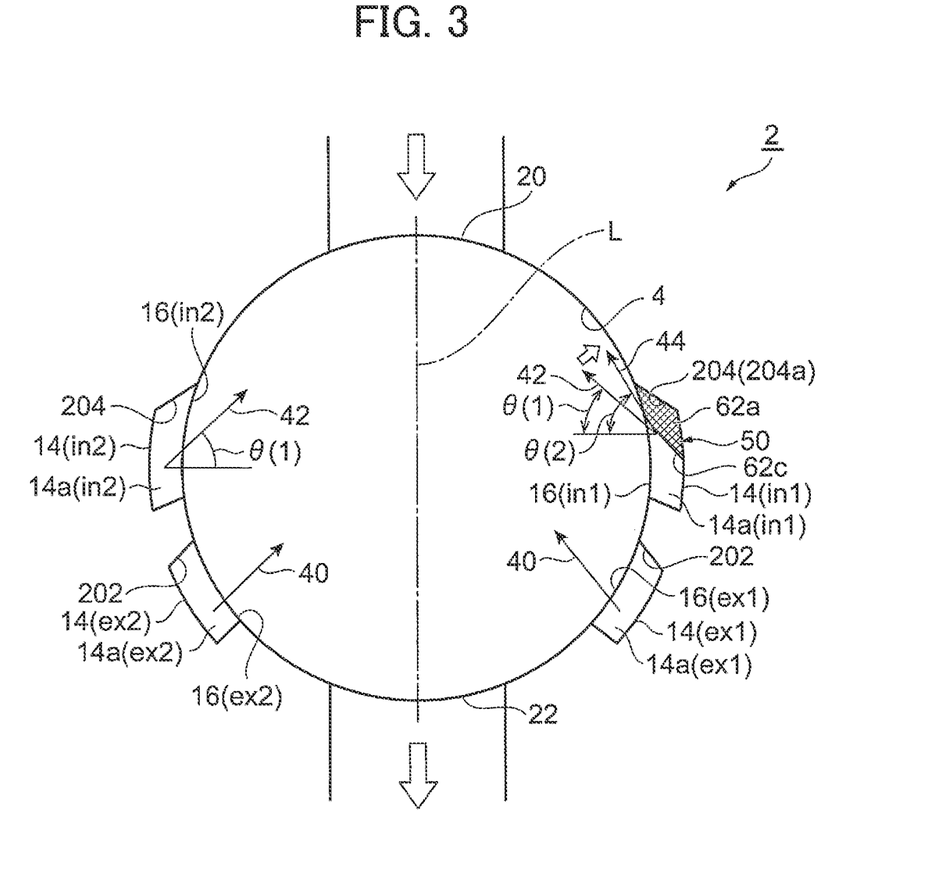
FIG. 3 shows a horizontal section view of the two-stroke engine of the embodiment at the height level of scavenging ports.

FIG. 3 is a schematic view in which the cylinder 4 is cross-sectioned horizontally, that is, orthogonally to a vertical movement of the piston 16, at the height level of the scavenging ports 16. As can be seen from FIG. 3, the engine 2 is a "Schnuerle scavenging engine" directing scavenging gas discharged from each of the four scavenging ports 16 toward the cylinder wall surface on the intake side. Scavenging gas impinging on the intake-side cylinder wall surface reverses and heads for the exhaust port 22.

In FIG. 3, the four rectangular scavenging ports 16 are arranged two by two on each side of the cylinder 4. In order to identify each of the scavenging ports 16, the scavenging port 16 lying toward the exhaust port 22, of the two scavenging ports 16 located on the right side in the drawing, is referred to as "first exhaust-side scavenging port", which is designated at reference numeral "16(ex1)". The scavenging port 16 lying toward the intake port 20 is referred to as "first intake-side scavenging port", which is designated at reference numeral "16(in1)".

The scavenging port 16 lying toward the exhaust port 22, of the two scavenging ports 16 located on the left side in the drawing, is referred to as "second exhaust-side scavenging port", which is designated at reference numeral "16(ex2)". The scavenging port 16 lying toward the intake port 20 is referred to as "second intake-side scavenging port", which is designated at reference numeral "16(in2)".

Continuing to refer to FIG. 3, as regards the first exhaust-side scavenging port 16(ex1) and the second exhaust-side scavenging port 16(ex2), and the second intake-side scavenging port 16(in2), of the four scavenging ports 16, a first flow direction of scavenging gas is defined by an intake-side wall surface 202 related to each of the first exhaust-side scavenging port 16(ex1) and the second exhaust-side scavenging port 16(ex2) and by an intake-side wall surface 204 related to the second intake-side scavenging port 16(in2), in the same manner as the prior art. An arrow 40 indicates the flow direction of scavenging gas discharged from the first exhaust-side scavenging port 16(ex1) and the second exhaust-side scavenging port 16(ex2). An arrow 42 indicates the flow direction of scavenging gas discharged from the second intake-side scavenging port 16(in2). These flow directions 40 and 42 are referred to as "first flow direction" since they are defined in common by the intake-side wall surfaces 202 and 204.

The remaining first intake-side scavenging port 16(in1) is common to the second intake-side scavenging port 16(in2) in that the former has an intake-side wall surface 204 defining the first flow direction 42 related therewith. The flow of scavenging gas discharged from the first intake-side scavenging port 16(in1) is typically oriented, at the height level of the first intake-side scavenging port 16(in1), to a second flow direction 44 greatly deflected to the intake side from the first flow direction 42, defined by the intake-side wall surface 204 at an upper end portion 14a(in1) of a first intake-side scavenging passage 14(in1) leading to the first intake-side scavenging port 16(in1). This second flow direction 44 is defined by a guide portion 50 lying at the upper end portion 14a(in1) of the first intake-side scavenging passage 14(in1).

To describe in more detail, when the first intake-side scavenging port 16(in1) begins to open with descent of the piston 6 and according as the opening increases, the direction of flow discharged from the first intake-side scavenging port 16(in1) changes from the first flow direction 42 to the second flow direction 44. In FIG. 3, the tilt angle of the first flow direction 42 is indicated by $\theta(1)$, which is referred to as first tilt angle $\theta(1)$. The tilt angle of the second flow direction 44 is indicated by $\theta(2)$, which is referred to as second tilt angle $\theta(2)$. The tilt angle $\theta$ means an angle on a horizontal plane with respect to a vertical line extending toward a cylinder center line L joining the intake port 20 and the exhaust port 22. The horizontal plane is a plane at the height level of the first intake-side scavenging port 16(in1). The plane is orthogonal to a vertical movement of the piston 16. The second tilt angle $\theta(2)$ of the second flow direction 44 is greater than the first tilt angle $\theta(1)$ of the first flow direction 42. That is, the second flow direction 44 is deflected to the intake side, in the direction of flow of scavenging gas, as compared with the first flow direction 42.

Figure 4:
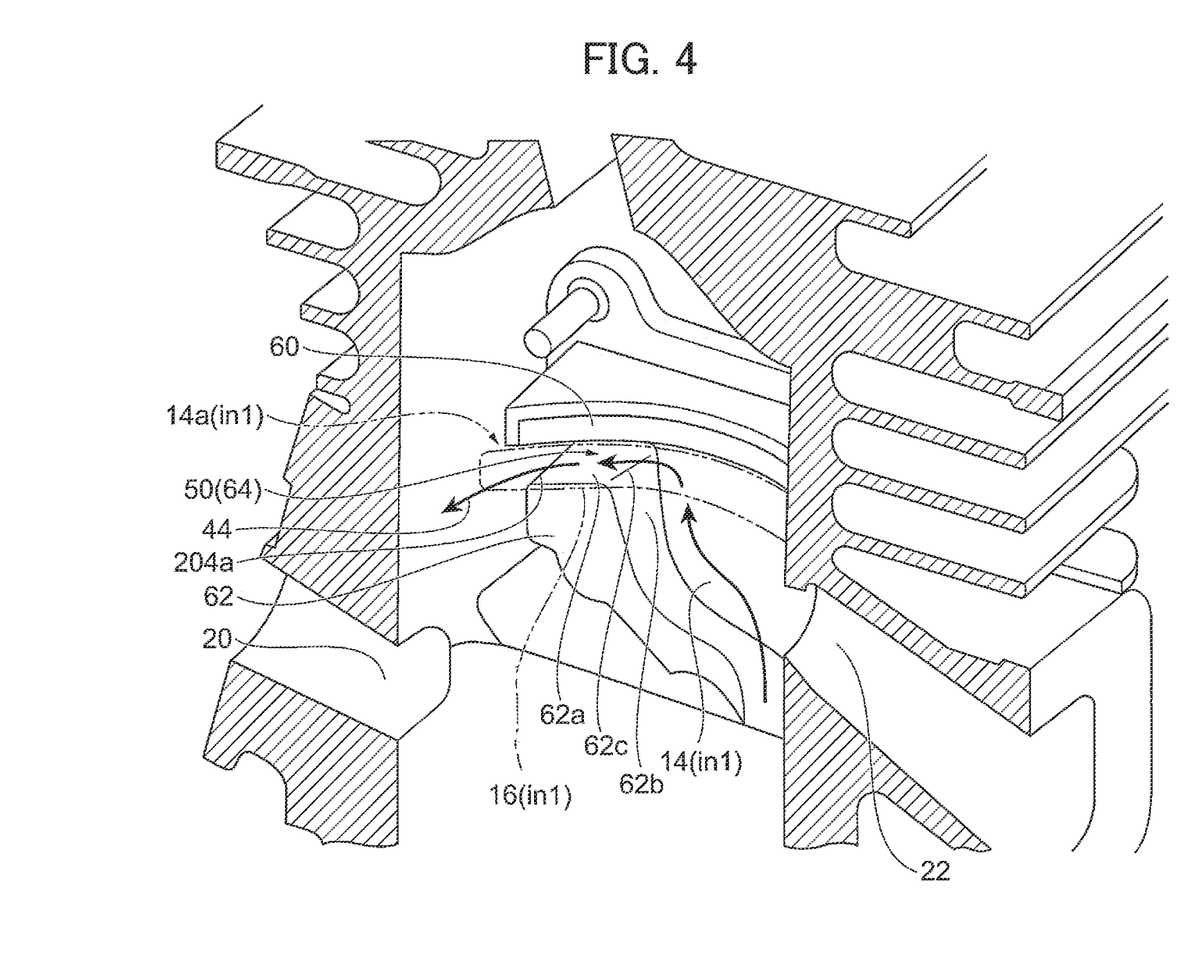
FIG. 4 shows an explanatory view of main parts, seen through the interior of a cylinder of the two-stroke engine of the embodiment.

FIG. 4 is a perspective view of the interior of the cylinder 4, showing the upper end portion 14a(in1) of the first intake-side scavenging passage 14(in1) related to the first intake-side scavenging port 16(in1). The first intake-side scavenging passage 14(in1) is defined, at its upper end, by eaves 60 extending in the circumferential direction of the cylinder 4. A raised portion 62 lies below the eaves 60 to form the shape of the upper end portion 14a(in1) of the first intake-side scavenging passage 14(in1).

In FIG. 4, the intake side is the left side of the first intake-side scavenging port 16(in1) indicated by a virtual line. In order to avoid the complication of the diagram, the intake-side wall surface 204 (FIG. 3) related to the first intake-side scavenging port 16(in1) is not shown. Instead, shown is a first boundary line 204a between the intake-side wall surface 204 and the scavenging passage upper end portion 14a(in1).

On the intake side of the first intake-side scavenging port 16(in1), the upper end portion of the raised portion 62 has an upper-end shoulder portion i.e. a shelf 62a extending horizontally along the lower end edge of the first intake-side scavenging port 16(in1), the upper-end shoulder portion i.e. the shelf 62a lying at the height level of the lower end edge of the first intake-side scavenging port 16(in1). The upper-end shoulder portion i.e. the shelf 62a of the raised portion 62 extends from an intake end (first boundary line 204a) of the first intake-side scavenging port 16(in1) toward the exhaust side in the circumferential direction of the cylinder 4. A guide groove 64 with a narrow vertical width is formed by the upper-end shoulder portion i.e. the shelf 62a and the eaves 60 positioned thereabove. The guide groove 64 is located facing the end portion on the intake side of the first intake-side scavenging port 16(in1).

The upper end portion of the raised portion 62 has an inclined guide surface 62b continuous with the upper-end shoulder portion i.e. the shelf 62a, extending vertically inclined, the inclined guide surface 62b being located below the lower end edge of the first intake-side scavenging port 16(in1). The inclined guide surface 62b is composed of an inclined surface which is formed by inclining a vertical surface parallel to the axis of the cylinder 4 toward the intake side and toward the inner side of the cylinder 4 according as it goes upward, to thereby allow the direction of flow of scavenging gas rising through the first intake-side scavenging passage 14(in1) to be directed toward the inner side of the cylinder 4 and toward the intake port 20.

At the upper end portion of the raised portion 62, the vertically extending inclined guide surface 62b merges via a second boundary line i.e. a guide line 62c with the horizontally extending shelf 62a. Referring to FIG. 3, at the height level of the first intake-side scavenging port 16(in1), the intake-side wall surface 204 i.e. the first boundary line 204a extends substantially in the direction of the first tilt angle θ(1) (FIG. 3). On the contrary, the second boundary line i.e. the guide line 62c extends substantially in the direction of the second tilt angle θ(2) (FIG. 3) at the height level of the first intake-side scavenging port 16(in1).

Although referring to FIGS. 3 and 4 the case has exemplarily been described where the guide portion 50 is disposed on the first intake-side scavenging passage 14(in1) leading to the first intake-side scavenging port 16(in1), the present invention is not limited thereto. The guide portion 50 may be disposed on a second intake-side scavenging passage 14(in2) leading to the second intake-side scavenging port 16(in2), instead of the first intake-side scavenging passage 14(in1) leading to the first intake-side scavenging port 16(in1), or may be disposed on both the first intake-side scavenging passage 14(in1) and the second intake-side scavenging passage 14(in2).

Figure 5:
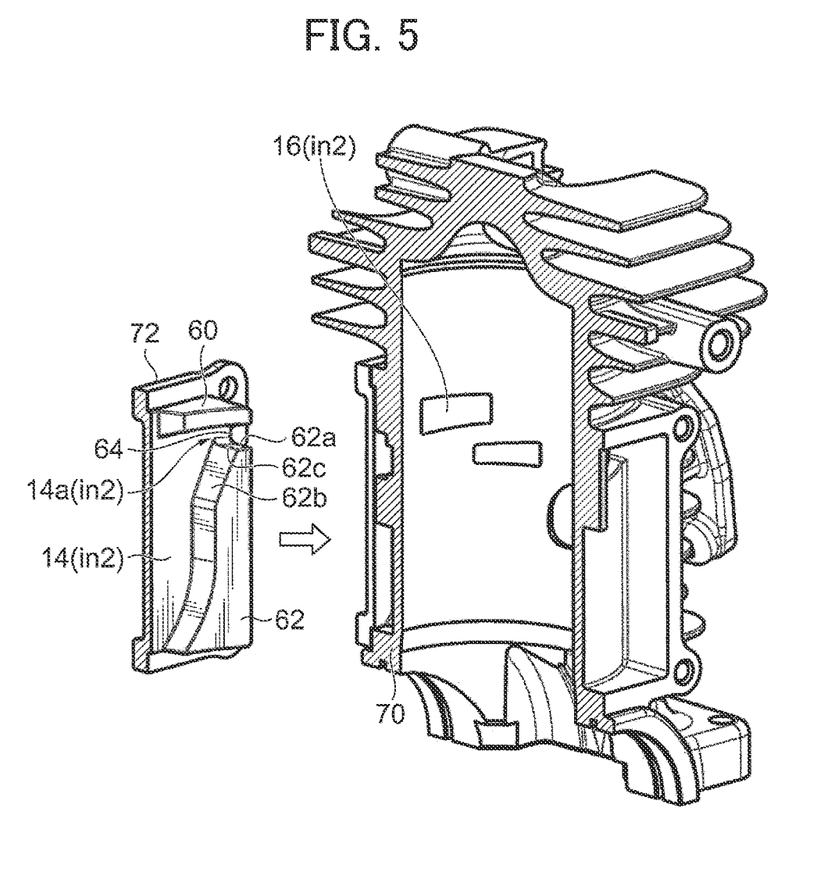
FIG. 5 shows a cylinder block of the engine of the embodiment and a first scavenging passage formation plate screwed thereon, the first scavenging passage formation plate acting to increase, than the prior art, the tilt angle of the direction of flow of scavenging gas discharged from a scavenging port.
Figure 6:
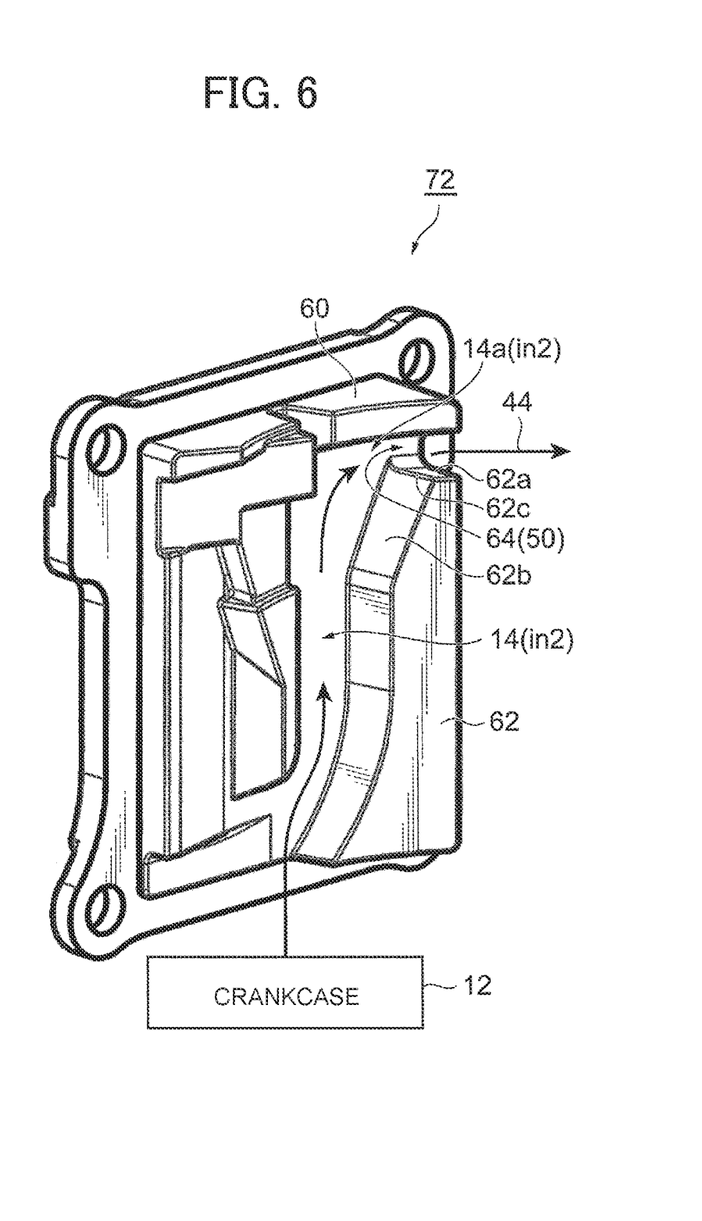
FIG. 6 shows a perspective view of the first scavenging passage formation plate shown in FIG. 5.

In cases e.g. where the guide portion 50 is disposed on the second intake-side scavenging passage 14(in2), a first scavenging passage formation plate 72 forming the second intake-side scavenging passage 14(in2) will be described with reference to FIGS. 5 and 6. Reference numeral 70 of FIG. 5 denotes a cylinder block of the engine 2. In the cylinder block 70, the second intake-side scavenging passage 14(in2) having the guide portion 50 is configured by removably screwing the first scavenging passage formation plate 72 onto the cylinder block 70. FIG. 6 is an enlarged view of the first scavenging passage formation plate 72. The passage shape of the second intake-side scavenging passage 14(in2) related to the second intake-side scavenging port 16(in2) is formed substantially by the raised portion 62 of the first scavenging passage formation plate 72. The raised portion 62, as described above, has the upper-end shoulder portion i.e. the shelf 62a, the inclined guide surface 62b, and the guide line 62c, with these elements making up the guide portion 50.

Figure 9:
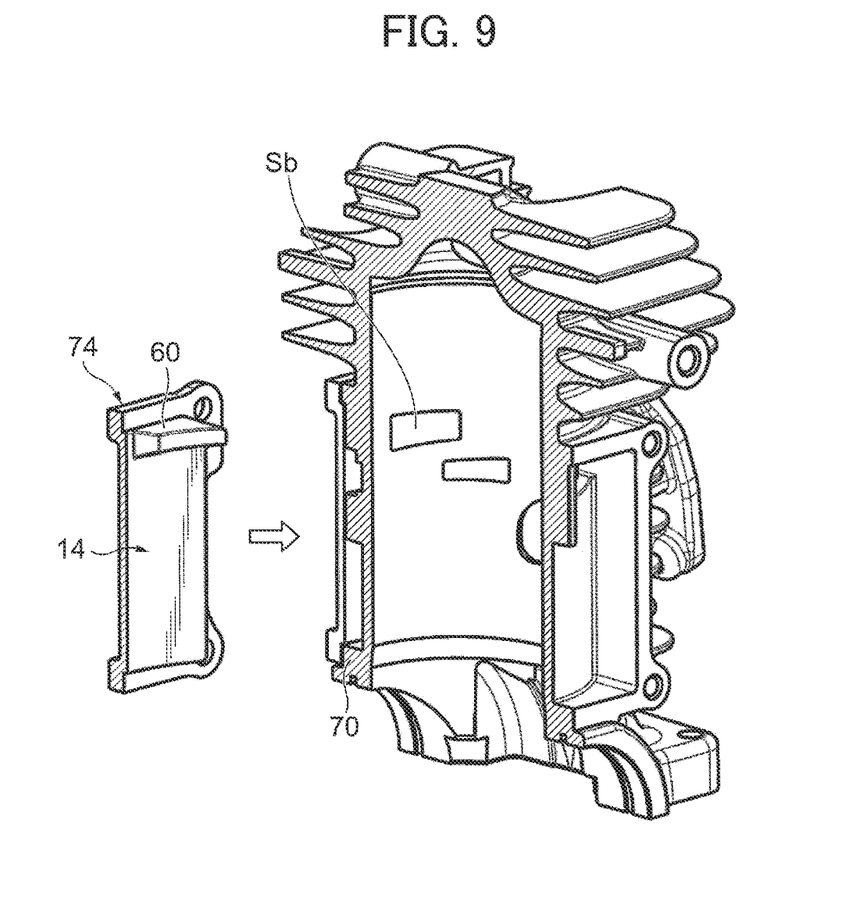
FIG. 9 shows a cylinder block of the conventional engine and a conventional scavenging passage formation member screwed thereon.

As a comparative example, a traditional structure shown in FIG. 9 will be described. Referring to FIG. 9, conventional scavenging ports Sb (FIG. 7), similarly to other scavenging ports Sa (FIG. 7), are configured by removably screwing a conventional scavenging passage formation plate 74 onto the cylinder block 70.

As can be well seen by comparing the first scavenging passage formation plate 72 (FIGS. 5 and 6) related to the present invention with the conventional scavenging passage formation plate 74 (FIG. 9), the first scavenging passage formation plate 72 and the conventional scavenging passage formation plate 74 are common in that both have the eaves 60 which defines the upper end of the scavenging passage 14. However, whereas the first scavenging passage formation plate 72 included in the present invention has the raised portion 62, the conventional scavenging passage formation plate 74 is composed of a flat surface without the raised portion 62.

To return to the engine 2 of the embodiment exemplarily shown in FIG. 3, the passage shape of the second intake-side scavenging passage 14(in2) leading to the second intake-side scavenging port 16(in2) shown in FIG. 3 is formed substantially by the conventional scavenging passage formation plate 74 (FIG. 9). The first and second exhaust-side scavenging passages 14(ex1) and 14(ex2) leading respectively to the first and second exhaust-side scavenging ports 16(ex1) and 16(ex2) are also composed of the conventional scavenging passage formation plate 74.

In the engine 2 exemplarily shown in FIG. 3, since the conventional scavenging passage formation plate 74 (FIG. 9) is composed of a flat surface as described above, the flow direction 42 of scavenging gas discharged from the second intake-side scavenging port 16(in2) is constant irrespective of the degree of opening of the second intake-side scavenging port 16(in2).

To describe the function during the scavenging process of the second intake-side scavenging port 16(in2) and the second intake-side scavenging passage 14(in2) formed by the conventional scavenging passage formation plate 74 (FIG. 9) in the engine 2 exemplarily shown in FIG. 3, air-fuel mixture in the crankcase 12 enters into the second intake-side scavenging passage 14(in2) and then rises to be discharged through the second intake-side scavenging port 16(in2) to the combustion chamber 8. The flow direction 42 of air-fuel mixture (scavenging gas) discharged from the second intake-side scavenging port 16(in2) is defined by the intake-side wall surface 204 (FIG. 3) related to the second intake-side scavenging port 16(in2), as described above, irrespective of the change in the degree of opening of the second intake-side scavenging port 16(in2) caused by descent of the piston 6. The tilt angle of the first flow direction 42 of scavenging gas discharged from the second intake-side scavenging port 16(in2) is θ(1), which is constant irrespective of the change in the degree of opening of the second intake-side scavenging port 16(in2) caused by descent of the piston 6.

In the engine 2 exemplarily shown in FIG. 3, the first intake-side scavenging passage 14(in1) leading to the first intake-side scavenging port 16(in1) is defined by the plate 72 (FIGS. 5 and 6) having the raised portion 62, substantially similar to the first scavenging passage formation plate 72 described above. In the case of the stratified scavenging engine for example, the flow of scavenging gas in the first intake-side scavenging passage 14(in1) and the first intake-side scavenging port 16(in1) will be described. When the crankcase 12 has a negative pressure with the ascent of the piston 6, leading air is filled from the leading air passage 34 of the intake system 24 via the piston groove 6a into the upper portion of the first intake-side scavenging passage 14(in1).

On the other hand, with descent of the piston 6, air-fuel mixture in the crankcase 12 is introduced from the scavenging gas inlet 18 of the first intake-side scavenging passage 14(in1) into the first intake-side scavenging passage 14(in1). When the piston 6 arrives at the top dead center and then descends to open the exhaust port 22, burned gas burned in the most recent cycle is exhausted from the exhaust port 22. When the first intake-side scavenging port 16(in1) then opens, leading air filled in the upper portion of the first intake-side scavenging passage 14(in1) is introduced in advance into the combustion chamber 8 and then air-fuel mixture pre-compressed in the crankcase 12 is introduced into the combustion chamber 8.

At the time of passing through the first intake-side scavenging passage 14(in1), leading air and air-fuel mixture are both given a specific directivity in flow direction by the guide portion 50 positioned at the upper end portion 14a(in1) of the first intake-side scavenging passage 14(in1) and then are discharged from the first intake-side scavenging port 16(in1) toward the combustion chamber 8.

The tilt angle of the second flow direction 44 of scavenging gas discharged from the first intake-side scavenging port 16(in1) is typically θ(2) (FIG. 3). The second flow direction 44 is induced by the guide portion 50. The second tilt angle θ(2) of the second flow direction 44 is greater than the first tilt angle θ(1) described above.

The function of the engine 2 exemplarily shown in FIG. 3 will hereinafter be described in detail. At the earliest stage of the scavenging process, the descending piston 6 slightly opens the upper end of the rectangular first intake-side scavenging port 16(in1). The directivity of scavenging gas flow at this time is defined by the intake-side wall surface 204 of the upper end portion 14a(in1) of the first intake-side scavenging passage 14(in1) leading to the first intake-side scavenging port 16(in1). That is, at the earliest stage of the scavenging process, scavenging gas discharged from the first intake-side scavenging port 16(in1) is guided by the intake-side wall surface 204 related to the first intake-side scavenging port 16(in1), in the same manner as the prior art, and the flow direction thereof is the first flow direction 42. In the case of the stratified scavenging engine, at the beginning of the scavenging process, leading air is directed by the intake-side wall surface 204 related to the first intake-side scavenging port 16(in1) to be introduced into the combustion chamber 8.

When further descent of the piston 6 allows the first intake-side scavenging port 16(in1) to open to the middle in the vertical direction, air-fuel mixture pre-compressed in the crankcase 12 begins to be introduced into the combustion chamber 8. The direction of discharge of scavenging gas at this time is influenced by both: the flow direction (first tilt angle θ(1)) of scavenging gas flow defined by the intake-side wall surface 204; and the flow direction (second tilt angle θ(2)) of scavenging gas flow generated by the guide portion 50 (particularly, the inclined guide surface 62b and/or the guide line 62c) disposed at the upper end portion 14a(in1) of the first intake-side scavenging passage 14(in1). At this stage, the flow of scavenging gas discharged from the first intake-side scavenging port 16(in1) has a tilt angle, on the horizontal plane, greater than the first tilt angle θ(1) by the second tilt angle θ(2). That is, as the scavenging process progresses, the flow direction of scavenging gas discharged from the first intake-side scavenging port 16(in1) is deflected to the intake side, and its horizontal tilt angle increases toward the intake side.

When the piston 6 further descends and the first intake-side scavenging port 16(in1) is opened to a great extent, in the case of the stratified scavenging engine, air-fuel mixture pre-compressed in the crankcase 12 is discharged as scavenging gas to the combustion chamber 8. When the first intake-side scavenging port 16(in1) is greatly opened, most of scavenging gas flow within the first intake-side scavenging passage 14(in1) is introduced into the combustion chamber 8 without reaching the intake-side wall surface 204. As a result, the factor defining the flow direction of scavenging gas discharged from the first intake-side scavenging port 16(in1) is the second tilt angle θ(2) that is defined by the guide portion 50 (particularly, the inclined guide surface 62b and/or the guide line 62c). That is, with the first intake-side scavenging port 16(in1) greatly opened, the flow direction of scavenging gas flow is most deflected to the intake side. The horizontal tilt angle of this scavenging gas flow direction is the second tilt angle θ(2).

As described above, the scavenging gas flow direction by the first intake-side scavenging port 16(in1), to which the present invention has been applied, changes from the first tilt angle θ(1) defined by the intake-side wall surface 204 to the second tilt angle θ(2) defined by the guide groove 64, depending on the degree of progress of the scavenging process, i.e. the degree of opening of the first intake-side scavenging port 16(in1). This second tilt angle θ(2) is greater than the first tilt angle θ(1) (FIG. 3).

Especially, in the stratified scavenging engine, the balance among the blow-by prevention, engine output improvement, and combustion stability can appropriately be adjusted by combining the directivities in response to changes in scavenging gas composition, from the early to the late stages of the scavenging process.

Similar to the prototype having the tilt angle θ of the intake-side wall surface 204 set to a large value, described with reference to FIG. 8, the engine 2 exemplarily shown in FIG. 3 was able to increase the output and keep the combustion stability while improving the emission characteristics. In the engine 2 of the embodiment, since the second flow direction 44 with a tilt angle θ greater than that of the first flow direction 42 is enabled by the guide portion 50 at the upper end portion 14a(in1) of the first intake-side scavenging passage 14(in1) leading to the first intake-side scavenging port 16(in1), there is no reduction in the scavenging passage cross-sectional area of the intake-side scavenging port Sb indicated and described by the virtual line VL in FIG. 8. In consequence, the stratified scavenging engine 2 advantageously does not narrow the volume at the upper end of the scavenging passage 14, i.e. the space for storing leading air.

Similar to at the upper end portion 14a(in1) of the first intake-side scavenging passage 14(in1) leading to the first intake-side scavenging port 16(in1), the guide groove 64 may be disposed on the second intake-side scavenging passage 14(in2) leading to the second intake-side scavenging port 16(in2). In this case, the tilt angles θ(2) of the second flow direction 44 of scavenging gas, formed separately by the guide portions 50 related to the first and second intake-side scavenging ports 16(in1) and 16(in2), may be the same as or different from each other. Examples of this type of two-stroke engine include an engine in which the intake port and the exhaust port face each other at a 180° position, and an engine in which they are slightly offset from the 180° position. An optimum combination of the first tilt angle and the second tilt angle can be selected depending on the various positional relationships between the intake port and the exhaust port.

Although the embodiments have hereinabove been described in which the present invention is applied to the stratified scavenging engine, the present invention is applicable to a two-stroke engine not containing leading air in scavenging gas, i.e. a conventional engine using air-fuel mixture pre-compressed in the crankcase 12 as scavenging gas. Also in the conventional engine all of whose scavenging gas flow is composed of air-fuel mixture, blow-by reduction, output improvement, and combustion stability are achieved by combining the flow directions of the scavenging gas flows to prolong the residence time of unburned gas in the cylinder.

The number of the scavenging ports is not limited to four, and the number is arbitrary. For example, the present invention is suitably applicable also to a two-flow scavenging engine having two scavenging ports. The present invention is suitably applicable also to a two-stroke engine employing a fuel injector in lieu of the carburetor 28. For example, in the case of applying the present invention to an in-cylinder direct injection two-stroke engine, air pre-compressed in the crankcase is used as scavenging gas. The scavenging efficiency in the cylinder 4 can be enhanced by applying the present invention to the in-cylinder direct injection two-stroke engine.

Some of two-stroke engines employ a fuel injector instead of a carburetor for the purpose of more precise fuel control. Regarding the arrangement of the fuel injector in these engines, it is conceived to: (i) arrange the fuel injector in the intake system of the engine; (ii) arrange the fuel injector in the crankcase; and (iii) arrange the fuel injector in the cylinder. The engine of the type having the fuel injector arranged in the cylinder is called "in-cylinder direct injection engine". In the in-cylinder direct injection two-stroke engine, air is fed into the crankcase, for pre-compression therein. The pre-compressed air is then introduced, as scavenging gas, through the scavenging passage and the scavenging port, into the cylinder 4 to be used for scavenging in the cylinder 4.

EXPLANATIONS OF LETTERS OR NUMERALS 2 engine
4 cylinder
6 piston
8 combustion chamber
12 crankcase
14 scavenging passage
14a upper end portion of scavenging passage
16 scavenging port
20 intake port
22 exhaust port
42 first flow direction
θ(1) tilt angle of first flow direction
44 second flow direction
θ(2) tilt angle of second flow direction
50 guide portion
60 eaves
62 raised portion
62a shelf (upper-end shoulder portion of raised portion)
62b inclined guide surface
62c guide line
64 guide groove
70 cylinder block
72 scavenging passage formation plate related to the invention
74 conventional scavenging passage formation plate
204 intake-side wall surface

What is claimed is:

1. A Schnuerle scavenging two-stroke engine including a plurality of scavenging passages each having a scavenging port that is an opening opened and closed by a piston, with scavenging gas discharged from the plurality of scavenging ports being directed toward an intake-side cylinder wall surface opposite to an exhaust port in a scavenging process, the scavenging gas impinging on the intake-side cylinder wall surface and reversing to head for the exhaust port, wherein
the scavenging passage related to at least one of the plurality of scavenging ports has, at its upper end portion, an intake-side wall surface that, at a height level of the scavenging port, defines a first flow direction of scavenging gas discharged from the at least one scavenging port into a combustion chamber, the engine comprising:
a guide portion disposed at the upper end portion of the scavenging passage related to the at least one scavenging port, for defining a second flow direction of scavenging gas discharged from the at least one scavenging port into the combustion chamber, wherein
the second flow direction is inside a cylinder relative to the first flow direction,
the guide portion has a guide surface disposed at the upper end portion of the scavenging passage related to the at least one scavenging port, for directing a flow direction of scavenging gas rising through the scavenging passage toward an inner side of the cylinder in the scavenging process, and
when the at least one scavenging port begins to open with descent of the piston and accordingly as the opening increases, the direction of flow discharged from the at least one scavenging port changes from the first flow direction to the second flow direction.

2. The Schnuerle scavenging two-stroke engine of claim 1,
wherein
the guide surface is positioned below a lower end edge of the at least one scavenging port, to constitute the guide portion.

3. The Schnuerle scavenging two-stroke engine of claim 2, comprising:
a shelf disposed at the upper end portion of the scavenging passage related to the at least one scavenging port, the shelf extending in a circumferential direction of the cylinder along the lower end edge of the at least one scavenging port, the shelf forming a guide groove that extends in the circumferential direction of the cylinder at the upper end portion of the scavenging passage related to the at least one scavenging port, wherein
the guide groove being positioned facing the at least one scavenging port.

4. The Schnuerle scavenging two-stroke engine of claim 3, comprising:
a guide line constituting a boundary between the shelf and the guide surface.

5. The Schnuerle scavenging two-stroke engine of claim 2, wherein
the Schnuerle scavenging two-stroke engine is a four-flow scavenging engine having four scavenging ports, wherein
the four scavenging ports include two exhaust-side scavenging ports positioned opposite to each other on exhaust port side and two intake-side scavenging ports positioned opposite to each other on intake port side, and wherein
the guide portion is disposed on the scavenging passage related to at least either one of the two intake-side scavenging ports.

6. The Schnuerle scavenging two-stroke engine of claim 2, wherein
the Schnuerle scavenging two-stroke engine is a four-flow scavenging engine having four scavenging ports, wherein
the four scavenging ports include two exhaust-side scavenging ports positioned opposite to each other on exhaust port side and two intake-side scavenging ports positioned opposite to each other on intake port side, and wherein
the guide portion is disposed on the scavenging passage related to each of the two intake-side scavenging ports.

7. The Schnuerle scavenging two-stroke engine of claim 6, wherein
the second flow direction of scavenging gas discharged from each of the two intake-side scavenging ports has the same tilt angle.

8. The Schnuerle scavenging two-stroke engine of claim 6, wherein
the second flow direction of scavenging gas discharged from each of the two intake-side scavenging ports has a different tilt angle.

9. The Schnuerle scavenging two-stroke engine of claim 1, wherein
the Schnuerle scavenging two-stroke engine is a four-flow scavenging engine having four scavenging ports, wherein the four scavenging ports include two exhaust-side scavenging ports positioned opposite to each other on exhaust port side and two intake-side scavenging ports positioned opposite to each other on intake port side, and wherein the guide portion is disposed on the scavenging passage related to at least either one of the two intake-side scavenging ports.

10. The Schnuerle scavenging two-stroke engine of claim 1, wherein the Schnuerle scavenging two-stroke engine is a four-flow scavenging engine having four scavenging ports, wherein the four scavenging ports include two exhaust-side scavenging ports positioned opposite to each other on exhaust port side and two intake-side scavenging ports positioned opposite to each other on intake port side, and wherein the guide portion is disposed on the scavenging passage related to each of the two intake-side scavenging ports.

11. The Schnuerle scavenging two-stroke engine of claim 1, wherein the plurality of scavenging passages are each formed by a scavenging passage formation member removably fixed to a cylinder block.

12. The Schnuerle scavenging two-stroke engine of claim 1, wherein the Schnuerle scavenging two-stroke engine is a conventional engine using, as scavenging gas, air-fuel mixture pre-compressed in a crankcase.

13. The Schnuerle scavenging two-stroke engine of claim 1, wherein the Schnuerle scavenging two-stroke engine is a stratified scavenging engine.

\* \* \* \* \*